US006805550B2

(12) United States Patent
Hilton et al.

(10) Patent No.: US 6,805,550 B2
(45) Date of Patent: Oct. 19, 2004

(54) METHOD OF OPERATING A FURNACE

(75) Inventors: Michael Hilton, Stockton-on-Tees (GB); John Wilson Kippax, West Rounton (GB)

(73) Assignee: Davy Process Technology Limited, London (GB)

( * ) Notice: Subject to any disclaimer, the term of this patent is extended or adjusted under 35 U.S.C. 154(b) by 0 days.

(21) Appl. No.: 10/416,852

(22) PCT Filed: Nov. 15, 2001

(86) PCT No.: PCT/GB01/05042

§ 371 (c)(1),
(2), (4) Date: May 16, 2003

(87) PCT Pub. No.: WO02/40396

PCT Pub. Date: May 23, 2002

(65) Prior Publication Data

US 2004/0101796 A1 May 27, 2004

(30) Foreign Application Priority Data

Nov. 17, 2000 (GB) .............................. 0028108

(51) Int. Cl.[7] .............................................. F23N 5/00
(52) U.S. Cl. ................................ 431/12; 431/5; 431/6
(58) Field of Search .............................. 431/6, 8, 5, 12, 431/10, 278, 283, 174, 268, 202; 422/196, 197, 198; 110/210, 211, 212, 344, 345

(56) References Cited

U.S. PATENT DOCUMENTS

| 4,234,257 A | * | 11/1980 | Carter et al. ................ 431/268 |
| 4,421,474 A | * | 12/1983 | Meyer ........................ 431/115 |
| 4,861,347 A | * | 8/1989 | Szydlowski et al. ........... 48/61 |
| 5,310,334 A | | 5/1994 | Spiros |
| 5,372,497 A | * | 12/1994 | Coolidge et al. .............. 431/6 |
| 5,811,065 A | | 9/1998 | Sterenberg |
| 5,823,124 A | * | 10/1998 | Koppang ....................... 431/5 |
| 5,957,678 A | * | 9/1999 | Endoh et al. .................. 431/5 |
| 6,136,279 A | | 10/2000 | Stahl |

FOREIGN PATENT DOCUMENTS

| DE | 38 32 804 A1 | * | 3/1990 |
| GB | 1037094 A | | 7/1966 |

OTHER PUBLICATIONS

International Search Report for International Application No. PCT/GB 01/05042, mailed Feb. 27, 2002, 3 pgs.

* cited by examiner

Primary Examiner—Josiah Cocks
(74) Attorney, Agent, or Firm—Senniger Powers

(57) ABSTRACT

The method of the invention concerns operation of a furnace utilizing a hydrogen-rich gas as furnace fuel. The furnace has multiplicity of burners for burning fuel supplied thereto. The method comprises providing ignition means for lighting a flame at at least one burner of the multiplicity of burners. An oxygen-containing gas and a combustible gas comprising a hydrocarbon gas are supplied to each of the multiplicity of burners in amounts capable of forming an ignitable mixture. A flame is ignited at the predetermined one burner which is then allowed to propagate from the at least one predetermined burner to the other burners of the multiplicity of burners. Then the composition of the combustible gas is altered over a period of time so as to replace at least a major part of the hydrocarbon gas by a hydrogen-rich gas until a hydrogen flame is established at each of the multiplicity of burners.

21 Claims, 2 Drawing Sheets

METHOD OF OPERATING A FURNACE

The present invention is directed to a method of operating a furnace, particularly a multi-burner furnace, which utilises a hydrogen-rich gas as fuel.

BACKGROUND OF THE INVENTION

When hydrogen is mixed with air in a wide range of proportions, a violent explosion can result upon ignition thereof. Moreover hydrogen has the maximum laminar burning velocity of any gas. Thus, whereas the flame speed of an acetylene flame is approximately 3.5 times that of most hydrocarbon fuels, the flame speed of a hydrogen flame is approximately 6 times higher than that of most hydrocarbons.

In certain chemical operations, particularly those involving endothermic reactions, such as steam reforming of natural gas or another hydrocarbon feedstock, it is expedient to pass the reaction mixture, for example, a mixture of the hydrocarbon feedstock and steam, through the reaction tubes of a multi-tubular reactor which are positioned in a suitable furnace and which are heated by means of a multiplicity of burners. The burners in steam reformer furnaces and other furnaces used in chemical plant operations can be supplied with any appropriate fuel, such as gas oil, natural gas, or the like. If different fuels are to be burnt, then more than one type of burner can be installed in the furnace. Often it is convenient and economical to utilise an available source of combustible waste gas as fuel for the furnace.

The reaction tubes in a steam reformer furnace typically have a nominal diameter of 5 inches (12.70 cm). They are usually mounted with their axes arranged substantially vertically and widely spaced one from another in order to allow heating by radiation and convective heating to occur. The burners can be arranged near the bottom of the furnace so that the flame extends substantially vertically upwards, while the reactant mixture can be simultaneously fed down the catalyst-filled steam reformer tubes. In another more common arrangement the furnace is top fired. In this case the burners are mounted near the top of the furnace so that the flame projects downwards into the furnace along the length of the catalyst filled, vertically mounted reformer tubes.

Other types of chemical plant which have furnaces include steam crackers for ethylene and catalytic reformers. The furnaces in such forms of plant are generally top fired or side fired. Fired heaters for heating, in general, such as refinery crude heaters and vacuum unit heaters, also have multiple burners. They may burn any of a wide variety of liquid and gaseous fuels, often using more than one type of burner for different fuels.

In all such furnaces the burners are normally quite widely spaced one from another and it is conventional practice to light the burners one by one with individual pilot flames or with an igniter, which is often a retractable igniter, because the burners are normally spaced too far apart to allow for reliable flame propagation. To prevent burn out, the burners and pilot-light burners can be retracted into the refractory lining. Block valves are usually provided in order to allow ignition to be carried out in this way and to permit maintenance of the burners. This applies also to burners which consist of a burner array, in which multiple burning points are supplied by a single supply tube or pipe off a common header. In each case it is common practice to light the burners individually.

In some situations a hydrogen-rich gas is available as a waste gas stream. If, however, a hydrogen-rich gas stream is used as fuel for a furnace having a large number of burners, there is potential for a large volume of appropriately mixed hydrogen and air to form above the burners, which will give rise to a grave risk of an explosion upon ignition of the hydrogen-rich gas stream. This explosion is capable of damaging the ceramic lining to the furnace chamber or the reaction tubes or other components in the furnace and causing risk to the operators of the plant.

It is known to use a hydrogen-containing stream as a fuel for a furnace. For example, it is known to utilise a methanol plant purge gas as fuel for a conventional reformer furnace. However, the purge gas stream at start up of a methanol plant is hydrogen-lean and only when the plant is fully operational does a hydrogen-rich purge gas become available, by which time the burners in the furnace have already been lit. Accordingly any changeover from hydrogen-lean gas as fuel to hydrogen-rich purge gas as fuel occurs only after the burners have already been lit.

A so-called compact reformer is described in International Patent Publication No. 94/29013. This has a closely packed array of reaction tubes, which are typically considerably smaller in diameter than the reaction tubes in conventional steam reformers. Thus the reaction tubes in a compact reformer typically have, for example, a nominal diameter of 1½ inches (3.81 cm) in comparison with a nominal diameter of 5 inches (12.70 cm) which is typical for the reaction tubes of a conventional reformer. Moreover the reaction tubes are spaced much closer to one another in a compact reformer than in a conventional steam reformer with the burners correspondingly being positioned closer to one another within the reaction tube matrix.

Since the burners are so much closer to one another in a compact reformer than in a conventional reformer furnace, there is generally insufficient room to accommodate individual control valves for each burner fuel jet. Hence the burner fuel jets must in this case be supplied from a common manifold. Moreover, since space is limited, it is hardly practical to provide multiple igniters or pilot flames and there would be an increased risk of burn out of the pilot-light fuel jets compared with conventional reformer furnaces. Autoignition would be another possibility but then it is not clear how this can be safely achieved. A further possibility is to effect ignition at an outer burner of the array and then to rely on flame propagation to ignite the other burners. Although the burners in a compact reformer are close enough to permit flame propagation from one to another if conditions are favourable, it is important that the correct range of velocities, fuel compositions and air:fuel ratios are used if the risks of explosions and of non-reliable ignition of all burners are to be avoided, particularly when the fuel concerned is hydrogen or a hydrogen-rich gas.

SUMMARY OF THE INVENTION

The present invention seeks to provide a method of igniting the burners of a furnace containing an array of closely spaced burners, such as a compact reformer, in a safe and reliable manner. In addition, it seeks to provide a method of operating a furnace with a multiplicity of burners which are arranged in an array but which are not capable of individual control, in particular which are not provided with individual control valves. It further seeks to provide a method of initiating ignition in a furnace with a multiplicity of burners without using individual igniting devices for each burner. The invention also seeks to provide a method permitting safe operation of a furnace having multiple burners utilising a hydrogen-rich gas as fuel, particularly during start-up of the furnace. It further seeks to provide a method of operating a multi-burner furnace utilising a hydrogen-rich gas as fuel in which the risk of a potentially hazardous explosion is substantially obviated. An additional objective of the invention is to provide a method of utilising safely the calorific value of a hydrogen-rich waste gas stream.

According to the present invention there is provided a method of operating a furnace utilising a hydrogen-rich gas as furnace fuel, the furnace having a multiplicity of burners for burning fuel supplied thereto, which method comprises (a) providing ignition means for lighting a flame at at least one predetermined burner selected from the multiplicity of burners, (b) supplying to each of the multiplicity of burners an oxygen-containing gas and a combustible gas comprising a hydrocarbon gas in amounts capable of forming an ignitable mixture, (c) igniting a flame at the at least one predetermined burner, (d) allowing a flame to propagate from the at least one predetermined burner to the other burners of the multiplicity of burners, and (e) altering the composition of the combustible gas over a period of time so as to replace at least a major part of the hydrocarbon gas by a hydrogen-rich gas until an at least predominantly hydrogen flame is established at each of the multiplicity of burners.

It will thus be seen that the method of the invention utilises, initially, in addition to an oxygen-containing gas, a hydrocarbon gas in an amount sufficient to form an ignitable mixture. The oxygen-containing gas and the combustible gas are supplied separately to each of the multiplicity of burners of the furnace, and then, once a flame has been lit at at least one predetermined burner selected from the multiplicity of burners, the resulting diffusion flame is allowed to propagate throughout the array to each of the remaining burners. Once a suitable flame has been established at each of the multiplicity of burners of the furnace, the composition of the combustible gas is progressively adjusted so that the hydrocarbon gas is replaced by a hydrogen-rich gas, while the air and combustible gas flow rates are adjusted so as to maintain a flame at each of the multiplicity of burners, thus obviating problems inherent in the direct ignition of the hydrogen-rich gas. Thereafter, once a flame has been established using the hydrogen-rich gas at each of the multiplicity of burners, the flow rates of the hydrogen-rich gas can be increased to the full operational flow rates.

The method of the invention concerns operation of a furnace utilising a hydrogen-rich gas as furnace fuel. The furnace has a multiplicity of burners for burning fuel supplied thereto. The method comprises providing ignition means for lighting a flame at at least one predetermined burner selected from the multiplicity of burners. An oxygen-containing gas and a combustible gas comprising a hydrocarbon gas are supplied to each of the multiplicity of burners in amounts capable of forming an ignitable mixture. A flame is ignited at the at least one predetermined burner and allowed to propagate from the at least one predetermined burner to the other burners of the multiplicity of burners. Then the composition of the combustible gas is altered over a period of time so as to replace at least a major part of the hydrocarbon gas by a hydrogen-rich gas until an at least predominantly hydrogen flame is established at each of the multiplicity of burners.

In the method of the invention all of the burners of the multiplicity of burners may be connected to a manifold through which the combustible gas is supplied.

During steps (a) to (e) a reduced volume flow rate of combustible gas is preferably used compared with the potential full operating flow rate for the combustible gas, if this were to be the fuel used to fire the furnace. Similarly a reduced flow rate of hydrogen-rich gas is preferably used during steps (a) to (e) compared with that prevailing during full operation of the furnace using the hydrogen-rich gas. The flow rate of the oxygen-containing gas can also be correspondingly reduced during steps (a) to (e). Thus during step (e) the flow rate of the hydrogen-rich gas can be much lower than the full operating rate envisaged by the designer of the furnace, typically less that about 25% of that full operating flow rate and even as low as about 10% or less, for example about 5%, of the full operating flow rate. However, once a hydrogen flame or an at least predominantly hydrogen flame has been established at each of the multiplicity of burners, the rates of supply of hydrogen-rich gas and of oxygen-containing gas can be increased to the full operating flow rates. Hence the flow rate of hydrogen-rich gas during step (e) may be reduced compared with the flow rate of hydrogen-rich gas during subsequent operation of the furnace. Thus the flow rate of the hydrogen-rich gas during step (e) may be less than about 25% of the full operating flow rate of hydrogen-rich gas for which the furnace is designed.

In many cases it will suffice to ignite a flame in step (c) at a single predetermined burner of the multiplicity of burners. However, it may be more convenient or expedient to ignite a flame in step (c) at two or more predetermined burners of the multiplicity of burners.

Preferably the multiplicity of burners is arranged in an array in the furnace such that a flame ignited at the or each predetermined burner, for example a burner in an outer part of the array, can propagate from the at least one predetermined burner to the other burners of the array.

In a preferred process the multiplicity of burners is mounted in a top portion of the furnace so that the flames from the multiplicity of burners extend downwards in use. Such a furnace can be, for example, a steam reformer furnace having a plurality of reformer tubes, each containing a charge of a steam reforming catalyst, the reformer tubes being arranged with their axes extending in a substantially vertical direction, while the multiplicity of burners is arranged in an array in a top portion of the furnace for heating the reformer tubes to a steam reforming temperature by means of flames extending downwards from the multiplicity of burners, and a reactant mixture comprising a mixture of steam and a hydrocarbon feedstock to be reformed is passed upwardly under steam reforming conditions through the heated reformer tubes. In such an arrangement the method of the invention overcomes the problem that, if an attempt were to be made to ignite the hydrogen-containing gas directly, the downward flow of air might be insufficient to produce a high enough downward air velocity to overcome the natural buoyancy of hydrogen, thus leading to a large envelope of hydrogen within the flammable region which may ignite in an explosive or uncontrolled way. If another gaseous hydrocarbon fuel, such as methane or natural gas, is used to initiate ignition in a furnace with down firing in accordance with the method of the invention, then its higher density, narrower flammable limits, and lower burning velocity minimise the risk of explosion at the time of ignition.

Alternatively the multiplicity of burners can be mounted in a bottom portion of the furnace so that the flames from the multiplicity of burners extend upwards in operation of the furnace.

The ignition means for lighting a flame at the predetermined one of the multiplicity of burners can be any ignition means of known type. For example, it may comprise a piezo-electric device which produces a spark upon actuation thereof. Alternatively it may comprises an electrically heated ignition element. It may comprise a pilot jet at which a pilot flame can be established prior to commencement of supply of combustible gas to the multiplicity of burners. It may be a retractable igniter device of known type.

Preferably the hydrocarbon gas is methane or natural gas. However, other hydrocarbon gases, such as ethane, propane, butane, or a mixture of two or more thereof, can be used, if desired, in place of or in admixture with natural gas or methane. The hydrocarbon gas can be mixed with an inert gas, such as nitrogen, argon, or the like, so long as upon admixture with air or other oxygen-containing gas the resulting mixture remains combustible.

In a particularly preferred method the furnace to be operated is a steam reformer furnace used to produce synthesis gas for use in an associated synthesis plant, such as a methanol synthesis plant, a Fischer Tropsch process plant, or an oxo plant for hydroformylation of an olefinic feedstock. Moreover the hydrogen-rich gas may comprise an unreacted waste gas stream from the synthesis plant.

The oxygen-containing gas can be oxygen, oxygen-enriched air, or air, but is preferably air. In this case the combustible gas supplied to the predetermined burner can be natural gas, while the oxygen-containing gas is air. Typically the combustible gas and air are supplied to the multiplicity of burners in amounts sufficient to provide a mixture of about 4% by volume of natural gas and 96% by volume of air at each of the multiplicity of burners. After a flame has been established at each of the multiplicity of burners, the amount of natural gas supplied to the multiplicity of burners can be gradually increased, incrementally or continuously, to provide a mixture of about 8% by volume of natural gas and 92% by volume of air at each of the multiplicity of burners.

In a preferred method in step (e) the composition of the combustible gas is altered until the combustible gas substantially consists of the hydrogen-rich gas. In this case step (e) can be effected over a period of from about 1 second to about 15 minutes, preferably over a period of from about 2 seconds to about 5 minutes, even more preferably over a period of from about 5 seconds to about 1 minute.

In step (e) of the method of the invention the composition of the combustible gas is altered until at least a major part (i.e. at least about 50%) of the hydrocarbon gas is replaced by the hydrogen-rich gas. It will normally be preferred to replace at least about 80%, and more often substantially 100%, of the hydrocarbon gas in the combustible gas of step (b) by the hydrogen-rich gas in step (e).

Preferably the burners are mounted in a top portion of the furnace so that the flame from the at least one burner, or from the array of burners, extends downwards.

By operating a steam reformer furnace in accordance with the method of the invention a hydrogen flame can be safely established in the furnace.

The hydrogen-rich gas can be pure hydrogen or a combustible mixture of hydrogen and one or more other gases, such as inert gases (e.g. nitrogen, argon, and the like), or hydrocarbon gases, such as methane, ethane, propane, butane, and the like. Preferably it comprises at least about 50% by volume of hydrogen, more preferably at least about 80% by volume of hydrogen, up to about 99% by volume or more of hydrogen. When the furnace is a steam reformer furnace used to generate by steam reforming of methane or natural gas synthesis gas for the production of methanol, for the Fischer Tropsch process, or for use in an oxo process, the resulting synthesis gas contains an excess of hydrogen, as will be explained further below, in which case the hydrogen-rich gas can be the unreacted gas remaining after the subsequent synthesis step or steps.

The principal reactions that occur in a steam reformer tube are:—

$$CH_4 + H_2O \leftrightharpoons CO + 3H_2; \quad (1)$$

$$CO + H_2O \leftrightharpoons CO_2 + H_2; \quad (2)$$

and $$2CO \leftrightharpoons CO_2 + C. \quad (3)$$

As a result the resulting synthesis gas contains a $H_2$:CO molar ratio of about 3:1 which is higher than the slightly greater than 2:1 $H_2$:CO molar ratio required for methanol synthesis. The reactions involved in synthesising methanol from carbon monoxide and from carbon dioxide, which is generally present as a minor component of the synthesis gas mixture, are:

$$CO + 2H_2 \leftrightharpoons CH_3OH; \quad (4)$$

and $$CO_2 + 3H_2 \leftrightharpoons CH_3OH + H_2O. \quad (5)$$

At all events, the synthesis of methanol from a synthesis gas produced by steam reforming of methane or natural gas results in a waste gas stream that is rich in hydrogen, which is suitable for use in the method of the invention. This waste gas can, if necessary, be subjected to suitable purification steps, such as pressure swing absorption, in order to increase the hydrogen content of the gas prior to use as fuel in the furnace, the residual gas which is rich in carbon oxides being recycled to the interior of the reaction tubes of the methanol synthesis zone.

It will usually be preferable to preheat the combustible gas and/or the oxygen-containing gas, e.g. air, prior to supply to the furnace. Such pre-heating can be effected in conventional manner by heat exchange against a convenient source of heat, such as the flue gases from the furnace. In this way the heat of combustion from the burners of the furnace is used to optimum efficiency. In such a pre-heating step the combustible gas and/or the oxygen-containing gas can be heated to a temperature in the range from about 300° C. to about 400° C.

In a preferred method according to the invention the preheated combustible gas is supplied, separately from the oxygen-containing gas, via a manifold to individual supply tubes feeding respective burners. These individual supply tubes are devoid of supply control valves. The oxygen-containing gas is preheated by heat exchange with the reformed gases and the hot oxygen-containing gas is used to heat the outside of the individual supply tubes through which the combustible gas is supplied so as to preheat the combustible gas.

When it is desired to shut down a furnace burning a hydrogen-rich fuel, the hydrogen-rich gas flow stream can be switched to a flow of an equivalent amount by volume of inert gas, such as nitrogen, while maintaining the flow of oxygen-containing gas. As the inert gas replaces the hydrogen-rich gas so the flame will be extinguished over a period of time. After a sufficient period of flow of the inert gas the risk of explosion in the burner assembly is removed thus avoiding a possibility of blowback. Extinction of the flame will lead to cessation of the steam reforming reaction and cooling of the reformed gases exiting the reaction tubes.

By maintaining a flow of air through the air inlet manifold, cooling of the furnace can be assisted.

BRIEF DESCRIPTION OF THE DRAWINGS

In order that the invention may be clearly understood and readily carried into effect a preferred process in accordance with the invention will now be described, by way of example only, with reference to the accompanying drawings, wherein:—

DETAILED DESCRIPTION OF THE INVENTION

Figure 1:
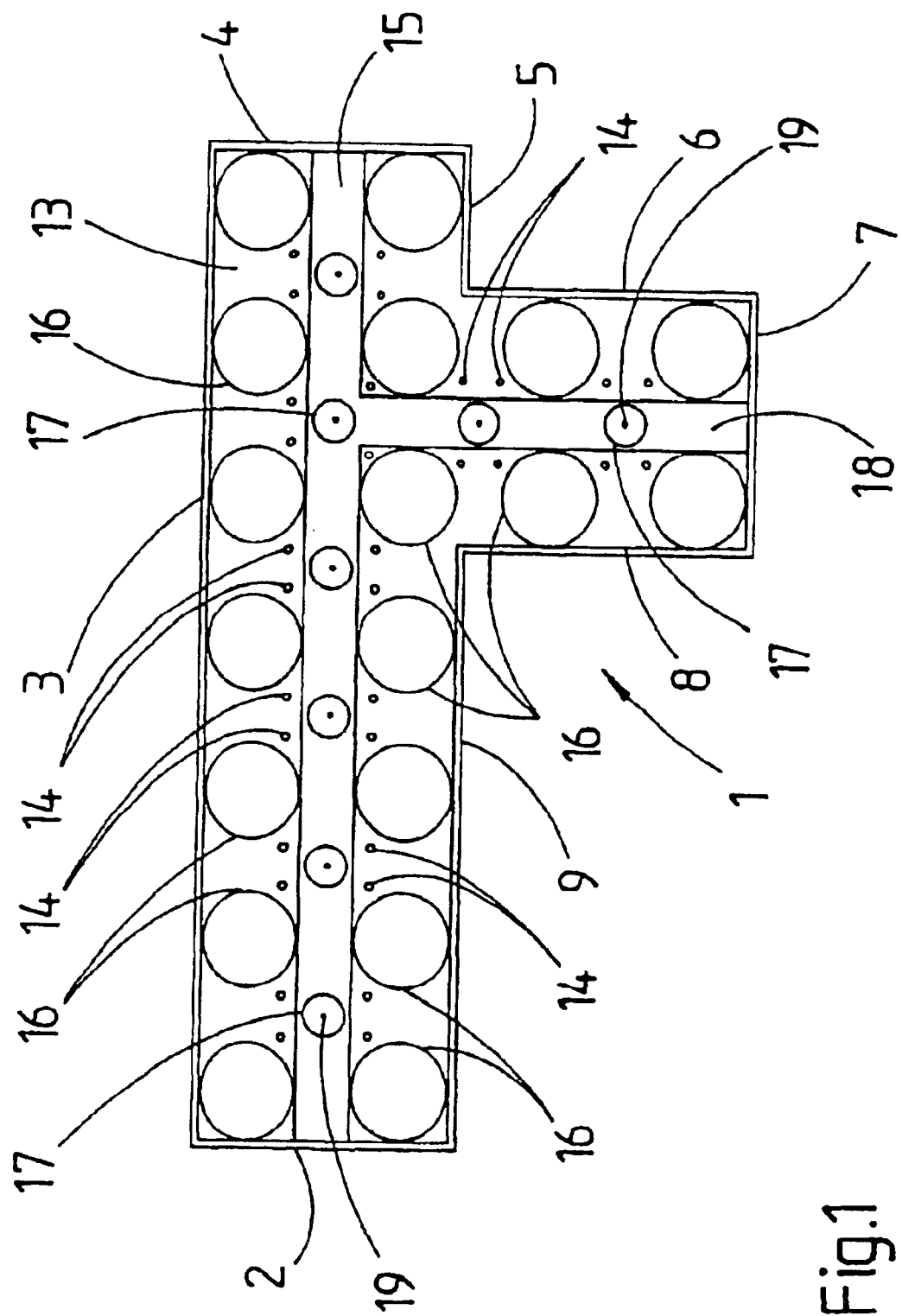
FIG. 1 is a top plan view of an experimental rig intended to simulate part of the burner array and tube array of a compact reformer furnace of the type disclosed in WO-A-94/29013.
Figure 2:
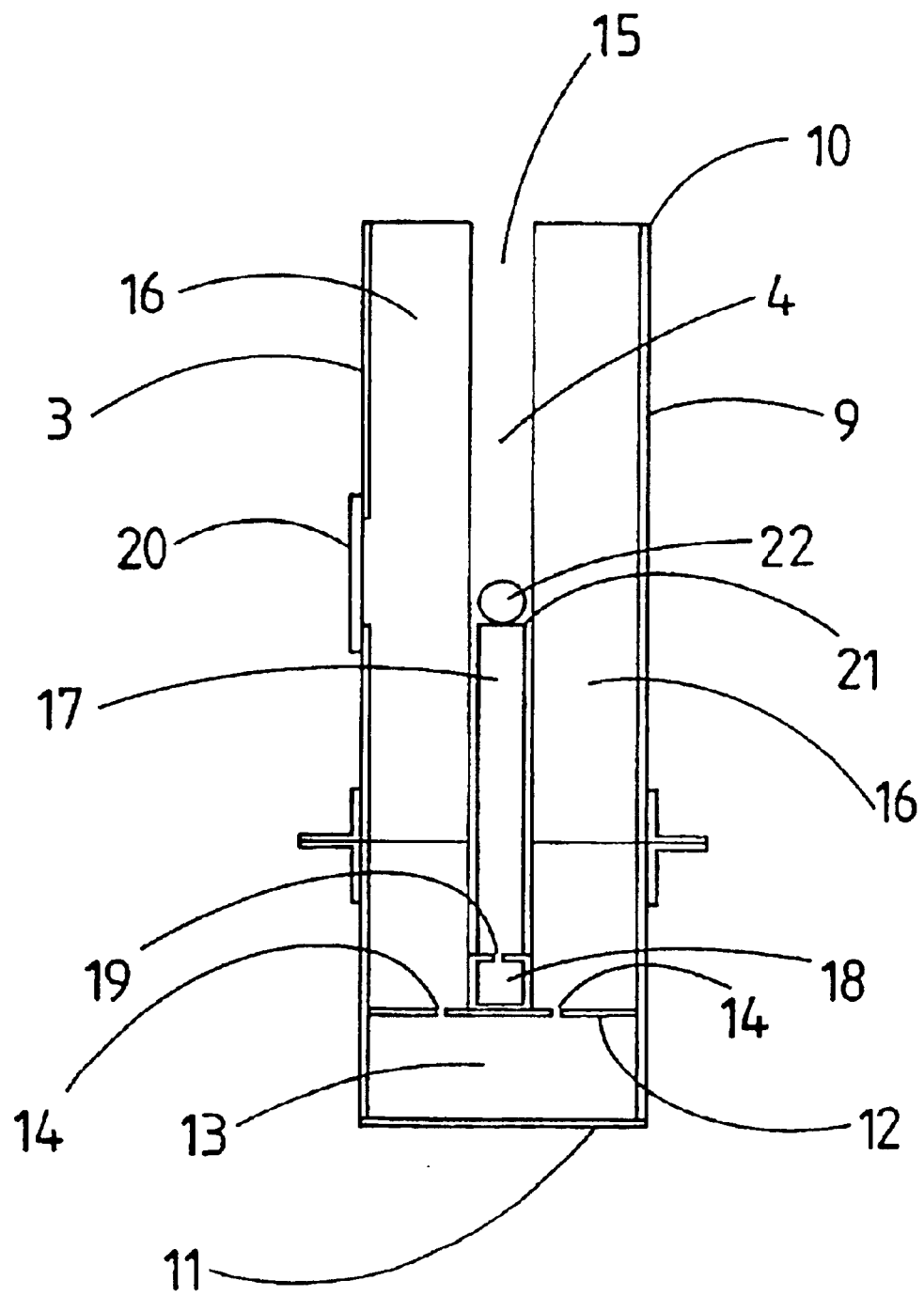
FIG. 2 is a vertical section through the experimental rig of FIG. 1.

Referring to the drawings, there is shown an experimental burner rig 1 which comprises a thermally insulated rectangular parallelipipedal box whose internal dimensions are 470 mm long×115 mm wide by 1625 mm high, to which is attached a second box 142 mm long×115 mm wide×1625 mm high. There is no wall between the two boxes and so the two boxes together form a box of generally offset T-section. The walls of the rig are formed by mild steel plates 2, 3, 4, 5, 6, 7, 8, and 9. The rig is open at its upper end 10 but has a closed lower end formed by mild steel bottom plate 11. Above bottom plate 11 is a transverse plate 12 also made of mild steel which forms the top of an air collector box 13 and the floor of a combustion space within the rig 1. Plate 12 is pierced with 3 mm diameter apertures 14 through which air for combustion can be drawn from air collector box 13 into a combustion chamber 15. All of the joints on the rig were sealed.

Within combustion chamber 15 there is mounted an array of eighteen aluminium tubes 16 of 45 mm outside diameter equally spaced on a 70 mm square pitch. Tubes 16 are thus arranged to replicate the external shape of reformer tubes in a compact reformer furnace. Spaced between the tubes 16 and at the centre of the square pitch are placed a total of eight burner tubes 17 which have an external diameter of 19 mm and a length of 150 mm. Six burners 17 are arranged in a straight line and two are in the side branch formed by walls 6, 7 and 8. Alumina spheres (not shown) are added to a depth of 50 mm to fill the gap between tubes 16 and burner tubes 17 so that about 100 mm of each of the burner tubes 17 projets above the alumina spheres. The burner tubes 17 are each supplied from a fuel manifold box 18, which is 25 mm high, through a respective single 2 mm diameter hole 19. Each burner tube is surrounded by four apertures 14 for supply of air thereto. This arrangement of burner tubes 17 and air supply apertures 14 provides, in combination with the dispersing effect of the alumina spheres, an effective distribution of air to burner tubes 17 similar to the forced air supply to an open furnace chamber containing reformer tubes.

In order to enable observation of the flames and flame propagation, a glass window 20 is installed in the wall 3 of the long side of the rig 1. The bottom of window 20 is level with the top end 21 of burner tubes 17. An 18 mm diameter hole 22 is provided in each of walls 2 and 4 and also in wall 7 with the bottom of hole 22 being level with the top end 21 of burner tubes 17. This hole 22 can be used for insertion of an oxygen-propane flame to act as pilot light to ignite the fuel from the adjacent burner tube 17 and provides additional viewing facilities. A mirror (not shown) is positioned at an angle above the open top end 10 of the rig 1 in such a way that observations can conveniently be made, looking down into the rig 1, without the observer being subjected to heat and fumes.

The invention is further illustrated in the following Examples. In the Examples all gas flow rates are expressed as l/h measured at 0° C. and 760 mm Hg (101.33 kPa).

EXAMPLE 1

Rig 1 was arranged to be supplied through fuel supply box 18 with substantially pure hydrogen gas as fuel and through air collector box 13 with air. The flow rates could be measured using appropriate rotameters (not shown). A series of tests was carried out each lasting only a few seconds. The procedure adopted involved establishing an air flow from air supply box 13 into the combustion chamber 15 through apertures 14 and then establishing a fuel flow into burner tubes 17 from fuel supply box 18 through apertures 19. An oxygen-propane pilot flame was first of all inserted into one of the ignition holes 22 so that, when hydrogen was subsequently supplied via manifold 18, a flame could be lit at the adjacent burner 17. If ignition did not occur the fuel flow was stopped and the air flow was changed to a new value. The fuel was then re-supplied and ignition tried again. In some cases the adjacent burner 17 to the one lit with the oxygen-propane pilot flame would also light and propagation of flames to all burners would often occur. A video recording was made of each ignition attempt. In those cases in which ignition occurred nitrogen was added to the combustion chamber 15 to extinguish the flames and the fuel supply was stopped. Without nitrogen addition blow-backs were frequently observed. The fuel supply was then re-established at a new value and ignition attempted at a new flow rate as previously described. For each fuel flow rate a number of different air flow rates were tried. From the experiments it was determined that ignition and propagation was feasible over a hydrogen flow range between 1600 and 5000 l/h with a range of excess air flow rates of from about 200% to about 400%. In other words ignition was feasible using about 10% v/v to about 15% v/v hydrogen in air mixtures. However, it was observed that ignition and flame propagation using hydrogen as fuel was, in general, violent and erratic. There was a distinct "pop" as each burner was lit from the flame above each burner tube 17. It was noted that at higher fuel flow rates the release of energy was greater and judged to be too violent, especially with lower excess air flow rates. At lower fuel flow rates the flame above the burner tubes 17 either did not form or was too weak to provide satisfactory propagation. This was also true at higher excess air flow rates. It was noted that the calculated fuel/air mixture in several of these unsatisfactory low fuel flow rates was close to the reported lower flammability limit of hydrogen in air of 4.0%.

EXAMPLE 2

The procedure of Example 1 was repeated except that natural gas was used as fuel. It was determined that ignition and flame propagation was feasible over a natural gas flow rate between 1450 l/h and 2900 l/h with a range of excess air flows between about 80% and about 100%. It was observed that ignition and propagation with natural gas was not violent and not erratic.

EXAMPLE 3

The procedure of Example 2 was repeated with an air flow of 35000 l/h and a natural gas flow of 1700 l/h such that a stable flame was established at each burner. A series of tests was then performed in which the natural gas flow was replaced with hydrogen at a flow rate of 4800 l/h over about 5 seconds to about 60 seconds. There were no violent or erratic changes in the flames and no explosions during or after the transition between the fuels.

EXAMPLE 4

Rig 1 is inverted with a wire mesh added to prevent the alumina spheres from falling out. The procedure of Example 1 is repeated with similar results except that the flames fire downwards.

EXAMPLE 5

With rig 1 inverted the procedure of Example 2 is repeated with similar results except that the flames fire downwards.

EXAMPLE 6

The procedure of Example 3 is repeated with rig 1 still inverted. Similar results are obtained with the flames firing downwards.

What is claimed is:

1. A method of operating a furnace utilising a hydrogen-rich gas as furnace fuel, the furnace having a multiplicity of burners for burning fuel supplied thereto, which method comprises:
   (a) providing ignition means for lighting a flame at at least one predetermined burner selected from the multiplicity of burners;
   (b) supplying to each of the multiplicity of burners an oxygen-containing gas and a combustible gas comprising a hydrocarbon gas in amounts capable of forming an ignitable mixture;
   (c) igniting a flame at the at least one predetermined burner;
   (d) allowing a flame to propagate from the at least one predetermined burner to the other burners of the multiplicity of burners; and
   (e) altering the composition of the combustible gas over a period of time so as to replace at least a major part of the hydrocarbon gas by a hydrogen-rich gas until an at least predominantly hydrogen flame is established at each of the multiplicity of burners.

2. A method according to claim 1, wherein the multiplicity of burners is arranged in an array in the furnace such that a flame ignited at the at least one predetermined burner can propagate to each of the other burners of the array.

3. A method according to claim 1, wherein the multiplicity of burners is mounted in a top portion of the furnace so that the flames from the multiplicity of burners extend downwards in operation of the furnace.

4. A method according to claim 2, wherein the multiplicity of burners is mounted in a top portion of the furnace so that the flames from the multiplicity of burners extend downwards in operation of the furnace.

5. A method according to claim 1, wherein the multiplicity of burners is mounted in a bottom portion of the furnace so that the flames from the multiplicity of burners extend upwards in operation of the furnace.

6. A method according to claim 2, wherein the multiplicity of burners is mounted in a bottom portion of the furnace so that the flames from the multiplicity of burners extend upwards in operation of the furnace.

7. A method according to claim 1, wherein the furnace is a steam reformer furnace having a plurality of reformer tubes, each containing a charge of a steam reforming catalyst, the reformer tubes being arranged with their axes extending in a substantially vertical direction, wherein the multiplicity of burners is arranged in an array in a top portion of the furnace for heating the reformer tubes to a steam reforming temperature by means of flames extending downwards from the multiplicity of burners, and wherein a reactant mixture comprising a mixture of steam and a hydrocarbon feedstock to be reformed is passed upwardly under steam reforming conditions through the heated reformer tubes.

8. A method according to claim 2, wherein the furnace is a steam reformer furnace having a plurality of reformer tubes, each containing a charge of a steam reforming catalyst, the reformer tubes being arranged with their axes extending in a substantially vertical direction, wherein the multiplicity of burners is arranged in an array in a top portion of the furnace for heating the reformer tubes to a steam reforming temperature by means of flames extending downwards from the multiplicity of burners, and wherein a reactant mixture comprising a mixture of steam and a hydrocarbon feedstock to be reformed is passed upwardly under steam reforming conditions through the heated reformer tubes.

9. A method according to claim 1, wherein the hydrocarbon gas comprises a gas selected from the group consisting of methane and natural gas.

10. A method according to claim 1, wherein the furnace is a steam reformer furnace used to produce synthesis gas for a downstream synthesis plant and wherein the hydrogen-rich gas comprises an unreacted waste gas stream from the downstream synthesis plant.

11. A method according to claim 10, wherein the downstream synthesis plant is selected from a methanol synthesis plant, a Fischer Tropsch plant, and an oxo plant.

12. A method according to claim 1, wherein the combustible gas supplied to the predetermined burner in step (b) is natural gas, wherein the oxygen-containing gas is air, and wherein the combustible gas and air are supplied to the multiplicity of burners in amounts sufficient to provide a mixture of about 4% by volume of natural gas and about 96% by volume of air at each of the multiplicity of burners.

13. A method according to claim 12, wherein, after a flame has been established at each of the multiplicity of burners, the amount of natural gas supplied to the multiplicity of burners is increased, incrementally or continuously, to provide a mixture of about 8% by volume of natural gas and about 92% by volume of air.

14. A method according to claim 1, wherein in step (e) the composition of the combustible gas is altered until the combustible gas substantially consists of the hydrogen-rich gas.

15. A method according to claim 14, wherein step (e) is effected over a period of from about 5 seconds to about 1 minute.

16. A method according to claim 1, wherein the flow rate of hydrogen-rich gas during step (e) is reduced compared with the flow rate of hydrogen-rich gas during subsequent operation of the furnace.

17. A method according to claim 16, wherein the volume flow rate of the hydrogen-rich gas during step (e) is less than about 25% of the full operating flow rate of hydrogen-rich gas for which the furnace is designed.

18. A method of operating a furnace utilising a hydrogen-rich gas as furnace fuel, the furnace having a multiplicity of burners for burning fuel supplied thereto, the multiplicity of burners being arranged in an array in the furnace such that a flame ignited at at least one predetermined burner can propagate to each of the other burners of the array, which method comprises:

(a) providing ignition means for lighting a flame at at least one predetermined burner selected from the multiplicity of burners;

(b) supplying to each of the multiplicity of burners air and natural gas as fuel in amounts sufficient to provide a mixture comprising about 4% by volume of natural gas and about 96% by volume of air;

(c) igniting a flame at the at least one predetermined burner;

(d) allowing a flame to propagate from the at least one predetermined burner to the other burners of the multiplicity of burners;

(e) after a flame has been established at each of the multiplicity of burners, increasing the amount of natural gas supplied to the multiplicity of burners, incrementally or continuously, so as to provide a mixture comprising about 8% by volume of natural gas and about 92% by volume of air;

(f) supplying hydrogen-rich gas to the multiplicity of burners in increasing amount while reducing the amount of natural gas supplied to the multiplicity of burners over a period of from about 5 seconds to about 1 minute so as to replace at least a major part of the natural gas as fuel by a hydrogen-rich gas until an at least predominantly hydrogen flame is established at each of the multiplicity of burners;

(g) maintaining the flow rate of hydrogen-rich gas during step (f) at a reduced flow rate compared with a design flow rate of hydrogen-rich gas for use during subsequent operation of the furnace; and (h) thereafter increasing the flow rate of hydrogen-rich gas to the multiplicity of burners to the design flow rate.

19. A method according to claim 18, wherein the furnace is a steam reformer furnace having a plurality of reformer tubes, each containing a charge of a steam reforming catalyst, the reformer tubes being arranged with their axes extending in a substantially vertical direction, wherein the multiplicity of burners is arranged in an array in a top portion of the furnace for heating the reformer tubes to a steam reforming temperature by means of flames extending downwards from the multiplicity of burners, and wherein a reactant mixture comprising a mixture of steam and a hydrocarbon feedstock to be reformed is passed upwardly under steam reforming conditions through the heated reformer tubes during operation of the furnace.

20. A method according to claim 19, wherein the furnace is a steam reformer furnace used to produce synthesis gas for a downstream synthesis plant selected from a methanol synthesis plant, a Fischer Tropsch plant, and an oxo plant, and wherein the hydrogen-rich gas comprises an unreacted waste gas stream from the downstream synthesis plant.

21. A method according to claim 18, wherein the volume flow rate of the hydrogen-rich gas during step (f) is less than about 25% of the design flow rate of hydrogen-rich gas.

* * * * *